B. BRANSON,

Assignor to himself, J. BRANSON and L. BRANSON.

FORCE AND SUCTION PUMP.

No. 9,810. Reissued July 19, 1881.

WITNESSES:

E. Wolff.

H. Booth

INVENTOR:

B. Branson by Chas. M. Higgins

Attorney

N. PETERS. Photo-Lithographer, Washington, D. C.

UNITED STATES PATENT OFFICE.

BENJAMIN BRANSON, OF FLUSHING, OHIO, ASSIGNOR TO HIMSELF, JOSEPH BRANSON, AND LEVI BRANSON.

FORCE AND SUCTION PUMP.

SPECIFICATION forming part of Reissued Letters Patent No. 9,810, dated July 19, 1881.

Original No. 167,060, dated August 24, 1875. Application for reissue filed April 9, 1881.

*To all whom it may concern:*

Be it known that I, BENJAMIN BRANSON, formerly of Barnesville, Belmont county, Ohio, but now of Flushing, in said county and State, have invented certain new and useful Improvements in Pumps, of which the following is a specification.

My invention applies more especially to force and suction pumps to be operated by hand, and also to such as have two pistons moving in a common chamber with the discharge-port between them; and my invention aims, partly, at compactness and simplicity, but chiefly seeks to effect a steady discharge of the water, even when the pump is operated slowly, and obviate the spurting action common to most pumps at the change of the stroke.

To these ends the chief feature of my invention consists in a certain construction and proportion of the air-chamber of the pump relatively to the pistons, cylinder, and discharge-pipe, whereby one part performs several functions, and jar in the cylinders is diminished, while a prolonged and more elastic action of the air-vessel is secured, and a raised head or column of water is made to assist its action, whereby the spurting intermittent action of ordinary air-vessels is overcome and a steady flow of the water from the discharge-pipe is effected, as hereinafter fully set forth.

Figure 1:
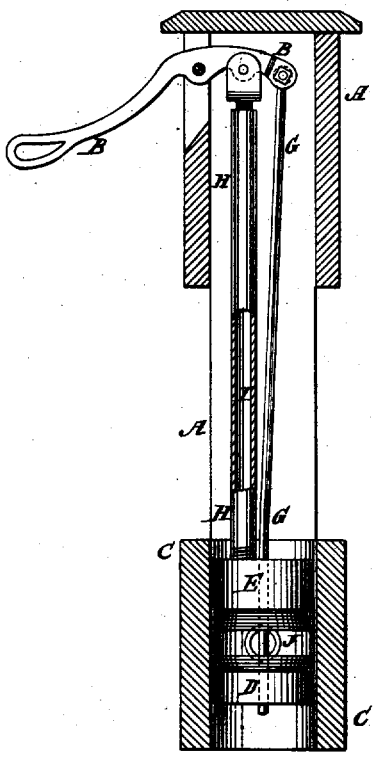
Figure 2:
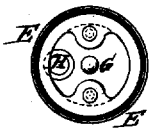

In the drawings annexed, Figure 1 presents a central vertical section of such parts of a double-piston pump as embody my invention. Fig. 2 is a bottom view of the upper or force bucket, and Fig. 3 is a central vertical section of the lower or suction bucket.

In Fig. 1, A represents a frame-work, in the top of which the hand-lever B is pivoted, with its short arm extending inward over the pump-cylinder and its long arm projecting outward.

C is the pump-cylinder, in which the pistons D and E work, the lower piston, D, being the suction-piston, and the upper one, E, the force-piston. The lower or suction piston, D, is constructed in the manner shown in Fig. 3, it being formed of a cup, D′, having its inner periphery made tapering.

Figure 3:
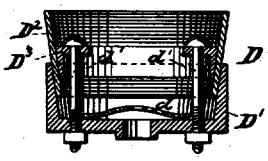

$D^2$ is the leather packing, in the form of a flaring ring, inserted in the upper end of the cup D′, and held in place by the tapering ring $D^3$, which is connected to the cup or piston-head by bolts *d′*, as shown, so that the ring thus wedges the leather packing between its outer tapering periphery and the inner tapering periphery of the piston cup or head, as fully shown in Fig. 3. The leather extends a short distance below the lower edge of the ring $D^3$, so that as the water fills the cup its pressure will cause the lower edge of the packing to be forced tightly against the wall of the cup, and thus form a water-tight joint to prevent leakage between the cup and the leather. The bottom of the suction-piston is perforated, and over the perforations is placed the valve *d*, which is hence situated below the line of the packing in the bottom of the cup, so as to render the bucket less liable to leak. The upper or force piston, E, is constructed in a similar manner, except that it is, of course, inverted, has a closed head, and is valveless.

G is the rod of the suction-bucket D, which is fixed at its lower extremity to the center of the bucket, and thence rises in a water-tight manner through the center of the force-bucket, as shown.

H is the rod of the force-bucket E, which, as may be observed, is made hollow or tubular, and forms the air-chamber of the pump. Both of these rods connect to the inner or short arm of the hand-lever B, but at a different radius, as shown, the rod G of the lower bucket being attached to the extremity of the short arm, while the hollow rod H of the upper bucket, which is, of course, closed at the top, connects to the short arm about midway between the former rod and the fulcrum of the lever. Hence, when the lever is operated, both pistons are moved simultaneously, but with a differential motion, and when the long arm of the lever is depressed both pistons are raised in the cylinder, and the space between them contracted, while, when the movement is reversed, both pistons descend in the cylinder and expand the space between them. The discharge-pipe J hence opens out of the cylinder, between the pistons, as shown.

The operation of the pump, except in its novel features, is the same as other double-piston pumps of this character—that is, the water drawn through the suction-valve of the cylinder (not shown) by the up motion of the suction-piston D is at the down motion of said piston transferred through its valve *d* into the expanding space between the two pistons, and on the reverse movement of the pistons one half of the water so drawn into the cylinder during the upstroke by the suction-piston D is ejected from the contracting space between the pistons, the other half being forced out during the returning down motion by the force-piston E, as will be readily understood.

The main feature of my invention, however, as before stated, consists in the form and relative arrangement of the air-vessel of the pump.

In operating force-pumps with a slow motion the ordinary construction of air-chambers does not avail to prevent the delivery of water in spurts.

Common air-vessels, as will be remembered, are usually of large size compared with the pump-cylinder, and of a broad low form, or of about the same dimensions as the cylinder, and a check-valve is frequently arranged between them and the cylinder, so that the reaction from the air-vessel is exerted only on the water in the discharge-pipe, and not also on the water in the cylinder.

In my pump it will be noted that the form and arrangement of the air-vessel H is peculiar. Thus it not only serves as the piston-rod, but is made much narrower and longer than the cylinder, in the form of a tube of small bore compared with its length, and as compared with common air-vessels it is contracted transversely and extended longitudinally in upright position to a great height above the cylinder, or to the operating-lever, which is the height to which the discharge-pipe usually extends. It will be also seen that this air-vessel opens directly into the cylinder between the pistons, and hence its reaction is exerted not only on the water in the discharge-pipe, but also on the water in the cylinder, so that at the change of stroke the reactive pressure thus applied on the piston-cups and suction-valve prevents any sudden relaxation, and thus prevents or reduces jar in the cylinder. The chief action of this attenuated and vertically-elongated air-chamber is, however, in evening up the discharge of the water, and effecting a peculiarly steady flow from the discharging-spout, free from spurts, whether the pump be operated slowly or fast.

This desirable result I attribute chiefly to the following causes: When the greatest resistance is encountered in the discharge-tube during the pumping action the greatest reaction occurs in the cylinder, causing a slender column of water to rise in the air-tube H, which, being of comparatively small area, meets at first with little resistance, on account of the attenuation of the air-column, and rapidly advances against it, and by the time it rises sufficiently high to encounter much resistance from the air its momentum causes it to rise higher in the tube, and thus compresses the air more than would the same mass in a broad slow-moving column. With an elongated air-tube the friction of the water against the surface of the tube is much increased, because there is much more surface than in an ordinary air-chamber, and its descent is therefore slower, and hence a more even flow of water is the result without the spurts common to most pumps; and, further, the air-column in the vertically-elongated air-tube is raised high above the base of the water-column in the discharge-tube, and is not subjected to the full or constant pressure of this column, like the bulb air-vessels placed at the base of the discharge-tube, which leaves the air in the tube with much more elasticity, and hence more water enters and leaves the air-tube at each stroke than in a low bulb air-chamber, in which the air is constantly subjected to the full pressure of the water in the discharge-tube, and after a few strokes becomes compressed to its maximum, which prevents much water from entering the chamber, and the weight of the water in the discharge-pipe admits of but little being forced out. The result of this is that the low bulb air-chamber is of but little use, compared with mine, in giving a continued voluminous flow from the air-chamber, which renders my pump much steadier in operation, and free from the spurts common to pumps having the low bulb air-chamber.

Another advantage of this construction is that I utilize nearly the whole length of the piston-rod as an air-chamber, thus making it serve the double purpose of air-chamber and a pump-rod for its whole length, or nearly so; and it should be understood that such tubular piston-rods may be used in any pump, of whatever construction, whether with one or two buckets, or whether the rod of one bucket passes through the other buckets or not.

It should be understood that to secure the advantages of the vertically-elongated air-chamber a proper proportion should be always observed between its diameter and length, for if the tube be too short for its diameter the air will have a greater density, owing to the pressure of the water in the discharge-tube, and consequently, being less elastic, will allow less water to enter at the action and pass out at the reaction than will be the case with the vertically-elongated air-tube such as I employ. The general rule for the proportion of the air-tube is that it should be made of such a length, in proportion to its diameter, that the time required for the water-column to pass out of the air-chamber shall be sufficient to compensate for the loss of time in changing the stroke of the lever. Ordinarily, by extending the air-tube from the cylinder to the height of the operating-lever, as shown, ample elongation and capacity is obtained for the best effect. In some cases, however, where the rod or tube H cannot be made long enough for this purpose, the other piston-rod, G, may also be made hollow, to serve as a supplementary air-chamber, and thus provide greater capacity.

I am aware that an air-chamber consisting of a hollow tube which forms the piston-rod is not, in itself, new; but in such cases there has been no proper regulation of length proportioned to diameter in the air-tube as to effect the result which I accomplish; and, furthermore, such previous air-tube has not been elongated or extended vertically, and has not been combined with a discharge-tube similarly extended vertically, for it should be understood that there is an intimate association or coaction, in producing the desirable results stated, between the elongated air-tube, the pistons of the pump-cylinder, and the discharge-tube, where both tubes open into the cylinder between the pistons and extend upwardly therefrom, as already described.

Another advantage of the elongated air-tube, not previously referred to, is that as the surface of the water-column which compresses the air is thus rendered very small there is hence little or no absorption of the air by the water, so that the charge of air retains its full force during even a constant action of the pump.

What I claim as my invention is—

1. In combination with a force-pump cylinder and the forcing-piston therein, an air-chamber in the form of a tube of great length in proportion to its bore, opening into said cylinder below the force-piston, substantially as and for the purpose set forth.

2. The combination, in a double-piston pump, of an air-chamber made in the form of a long tube of small bore, and a discharge-tube, both opening into the pump-cylinder between the pistons, substantially as herein shown and described.

3. In a force-pump, a hollow piston-rod organized to form an elongated air-chamber of great length in proportion to its bore, and placed in upright position, with the open end of said air-chamber terminating at the piston and in the pump-cylinder, substantially as and for the purpose set forth.

4. The combination, with a pump-cylinder having two pistons, one above the other, of a discharge-pipe and a hollow pump-rod, forming an air-chamber, both opening into the cylinder between the pistons, substantially as and for the purposes set forth.

5. In a double-piston pump adapted to have its cylinder in the well and its operating-lever supported above the same, an air-chamber in the form of a tube opening into the cylinder between the pistons and extending above the well, substantially as described, and for the purposes set forth.

BENJAMIN BRANSON.

Witnesses:
O. J. BRANSON,
J. A. KIRKPATRICK.